United States Patent [19]

Kinaga et al.

[11] Patent Number: 4,904,053
[45] Date of Patent: * Feb. 27, 1990

[54] CURABLE COMPOSITION

[75] Inventors: Yoshimasa Kinaga, Kanagawa; Shigeo Murofushi, Hiratsuka; Kenji Seko, Yokosuka, all of Japan

[73] Assignee: Kansai Paint Company, Limited, Amagasaki, Japan

[*] Notice: The portion of the term of this patent subsequent to May 23, 2006 has been disclaimed.

[21] Appl. No.: 322,966

[22] Filed: Mar. 14, 1989

Related U.S. Application Data

[62] Division of Ser. No. 130,505, Dec. 9, 1987, Pat. No. 4,833,207.

[30] Foreign Application Priority Data

Dec. 18, 1986 [JP] Japan .................................. 61-303514
Jun. 9, 1987 [JP] Japan .................................. 62-144475
Jul. 2, 1987 [JP] Japan .................................. 62-166059

[51] Int. Cl.$^4$ .............................................. G02B 6/00
[52] U.S. Cl. ................................ 350/96.34; 350/96.30
[58] Field of Search ............... 350/96.29, 96.34, 96.30; 526/245

[56] References Cited

U.S. PATENT DOCUMENTS 4,539,250  9/1985  Fujii et al. .......................... 526/245

FOREIGN PATENT DOCUMENTS 61-120705  6/1986  Japan ................................... 526/245

*Primary Examiner*—Joseph L. Schofer
*Assistant Examiner*—N. Sarofim
*Attorney, Agent, or Firm*—Armstrong, Nikaido, Marmelstein, Kubovcik & Murray

[57] ABSTRACT

Disclosed is a curable composition consisting essentially of (i) a polymerizable double bond-containing resin prepared by introducing a polymerizable double bond-containing group into a polymer containing as a monomer a fluoroalkyl acrylate or methacrylate represented by the formula $$CH_2=C(R)-COO(CX_2)_m(CF_2)_nX \qquad (I)$$

wherein R is methyl or hydrogen, X is fluorine or hydrogen, m is 1 or 2 and n is an integer of 1 to 12, and (ii) a fluoroalkyl acrylate or methacrylate of the formula (I).

7 Claims, No Drawings

CURABLE COMPOSITION

This application is a divisional application of Ser. No. 130,505, filed Dec. 9, 1987, now U.S. Pat. No. 4,833,207. This invention relates to novel curable compositions.

BACKGROUND OF THE INVENTION

In recent years, technologies of optical fibers have achieved remarkable developments and have found a wide range of practical applications in fields such as communications, control systems, various optically measuring techniques and the like. Included among such technologies is, for example, a system in which signals are converted into optical signals and the optical signals are transmitted through optical fibers and received as changed to the contemplated type of signals.

An optical fiber is comprised of a core and a cladding surrounding the core. The core for an optical fiber usually has a refractive index of about 1.43 to about 1.60 and is produced by drawing quartz glass or like glass into threads or made of fibers of polymethyl methacrylate or like plastics. Generally the core has a diameter of about 5 to about 1000 $\mu$m. The cladding is a transparent coating layer of about 3 to about 100 $\mu$m thickness formed around the core and having a lower refractive index than the core.

Optical signals are transmitted through the core of an optical fiber, repeating total reflection at the interface between the core and the cladding during the transmission. For efficient transmission of optical signals through the optical fiber over a long distance with substantially no loss, cladding materials for optical fibers are required to have properties of being:

(1) lower in refractive index than the core,
(2) excellent in adhesion to the core,
(3) outstanding in flexibility,
(4) not crystalline,
(5) least light-absorbable,
(6) not prone to thermal decomposition and thermal contraction,
(7) scarcely variable in properties depending on temperatures,
(8) high in water resistance and oil resistance, and
(9) outstanding in curability and strength.

Conventional cladding materials include, for example, silicone resins, fluorine-containing resins, boron- or fluorine-containing quartz glass and the like. However, these materials are not satisfactory in properties. More specifically, silicone resins have the drawbacks of having a high refractive index and being prone to thermal decomposition and thermal contraction, widely variable in properties with temperatures and poor in curability and strength. Generally it is known to use as fluorine-containing resins non-crosslinkable thermoplastic resins such as a copolymer of vinylidene fluoride and tetrafluoroethylene (U.S. Pat. No. 3,930,103) and a fluoroalkyl methacrylate polymer (U.S. Pat. No. 1,039,498). The former polymer remains slightly crystalline in the fiber and thus causes light scattering at the interface between the core and the cladding, thereby leading to reduction of transmitting properties, whereas the latter polymer has the disadvantages of being insufficient in adhesion to the core and flexibility, and widely variable in properties with temperatures. Boron or fluorine-containing quartz glass is unsatisfactory in flexibility and considerably expensive, thus economically undesirable.

It is an object of the present invention to provide a novel curable composition significantly suitable as a cladding material for optical fibers.

It is another object of the invention to provide a novel curable composition which can overcome the foregoing drawbacks of conventional cladding materials and which is fully satisfactory in all of the properties required of cladding materials.

These and other objects of the present invention will become more apparent from the following description.

BRIEF SUMMARY OF THE INVENTION

The present invention provides a curable composition consisting essentially of (i) a polymerizable double bond-containing resin prepared by introducing a polymerizable double bond-containing group into a polymer containing as a monomer a fluoroalkyl acrylate or methacrylate represented by the formula $$CH_2=C(R)-COO(CX_2)_m(CF_2)_nX \qquad (I)$$

wherein R is methyl or hydrogen, X is fluorine or hydrogen, m is 1 or 2 and n is an integer of 1 to 12, and (ii) a fluoroalkyl acrylate or methacrylate of the formula (I).

We conducted extensive research to develop cladding materials which can overcome the aforesaid drawbacks of conventional cladding materials and which are fully satisfactory in all of the properties required of cladding materials. Our research has revealed the following novel findings.

(A) The composition consisting essentially of the above-specified polymerizable fluorine-containing unsaturated resin and the above-specified fluorine-containing unsaturated monomer can readily crosslink to cure on irradiation of actinic radiation such as ultraviolet rays or electron beams.

(B) The cured product of this composition can fully exhibit the foregoing properties required of cladding materials.

DETAILED DESCRIPTION OF THE INVENTION

The present invention has been accomplished based on these novel findings.

The polymerizable double bond-containing resin to be used as the component (i) is a polymer containing as a monomer a fluoroalkyl acrylate or methacrylate of the formula (I). This resin is prepared by introducing a polymerizable double bond into the polymer. According to the invention, the resin is one prepared usually by reacting a copolymer comprising as the comonomers a monomer of the formula (I) and a vinyl monomer containing a functional group for introducing a polymerizable double bond with a compound containing a polymerizable double bond and a functional group reactive with the functional group of the vinyl monomer to introduce the polymerizable double bond into the side chain of the copolymer.

Examples of the vinyl monomer containing a functional group for introduction of a polymerizable double bond are epoxy group-containing vinyl monomers, hydroxyl group-containing vinyl monomers, carboxyl group-containing vinyl monomers, isocyanate group-containing vinyl monomers and the like. Preferably the compound reactive with the functional group of such vinyl monomer in an ester linkage-forming reaction, urethane linkage-forming reaction or like reaction is selected from the above-exemplified vinyl monomers as the compound containing a polymerizable double bond and a functional group reactive with the functional group of the vinyl monomer. For example, when an epoxy group-containing or hydroxyl group-containing vinyl monomer is used as the functional group-containing comonomer for the copolymer in the introduction of a polymerizable double bond by an ester linkage-forming reaction, a carboxyl group-containing vinyl monomer is used as the compound to be reacted with the copolymer. Reversely when a carboxyl group-containing vinyl monomer is used as the comonomer, an epoxy group-containing or hydroxyl group-containing vinyl monomer is used as the compound to be reacted therewith. Or when a hydroxyl group-containing vinyl monomer is used as the comonomer in the introduction of a polymerizable double bond by a urethane linkage-forming reaction, a hydroxyl group-containing vinyl monomer is used as the compound to be reacted therewith via a polyisocyanate compound. Optionally, when an isocyanate group-containing vinyl monomer is used as the comonomer, a hydroxyl group-containing vinyl monomer is used as the compound to be reacted therewith.

It is preferred in preparation of the component (i) to use a fluoroalkyl acrylate or methacrylate of the formula (I) wherein n is an integer of 2 to 8. Preferred examples of the fluoroalkyl acrylate or methacrylate of the formula (I) are 1H,1H,3H-tetrafluoropropyl acrylate or methacrylate (n=2), 1H,1H,5H-octafluoropentyl acrylate or methacrylate (n=4), 1H,1H-tridecylfluoroheptyl acrylate or methacrylate (n=6), 1H,1H,2H,2H-heptadecafluorodecyl acrylate or methacrylate (n=8) and the like. Among these examples, more preferable are 1H,1H,3H-tetrafluoropropyl acrylate or methacrylate, 1H,1H,5H-octafluoropentyl acrylate or methacrylate and 1H,1H,2H,2H-heptadecafluorodecyl acrylate or methacrylate.

Examples of the epoxy group-containing vinyl monomer are glycidyl acrylate or methacrylate, metaglycidyl acrylate or methacrylate and the like.

Examples of the hydroxyl group-containing vinyl monomer are monoester of acrylic or methacrylic acid with dihydric alcohol (having 2 to 6 carbon atoms) such as hydroxyethyl acrylate or methacrylate, hydroxypropyl acrylate or methacrylate, hydroxybutyl acrylate or methacrylate and the like; caprolactam-modified acrylate or methacrylate; and like acrylic or methacrylic monomers.

Examples of the carboxyl group-containing vinyl monomer are acrylic or methacrylic acid, 2-acryloyloxyethylsuccinic acid, 2-methacryloyloxyethylsuccinic acid, 2-acryloyloxyethylmaleic acid, 2-methacryloyloxyethylmaleic acid, 2-acryloyloxyethylphthalic acid, 2-methacryloyloxyethylphthalic acid, 2-acryloyloxyethylhexahydrophthalic acid, 2-methacryloyloxyethylhexahydrophthalic acid, β-carboxyethyl acrylate, β-carboxyethyl methacrylate and like unsaturated monobasic acids.

Examples of the isocyanate group-containing vinyl monomer are isocyanate ethyl acrylate or methacrylate, m-isopropenyl-α,α'-dimethylbenzyl isocyanate, a urethane linkage-forming reaction product prepared by reacting the hydroxyl group-containing vinyl monomer with a polyisocyanate compound in substantially equimolar amounts.

Exemplary of the polyisocyanate compound are compounds having at least 2 isocyanate groups in the molecule such as tolylene diisocyanate, 4,4'-diphenylmethane diisocyanate, xylylene diisocyanate, hexamethylene diisocyanate, lysine diisocyanate, 4,4'-methylenebis(cyclohexyl-isocyanate), methylcyclohexane-2,4-diisocyanate, methylcyclohexane-2,6-diisocyanate, 1,3-(isocyanate-methyl-cyclohexane, isophorone diisocyanate, trimethylhexamethylene diisocyanate, dimeric acid diisocyanate, dianisidine diisocyanate, phenyl diisocyanate, halogenated phenyl diisocyanate, methylene diisocyanate, ethylene diisocyanate, butylene diisocyanate, propylene diisocyanate, octadecylene diisocyanate, 1,5-naphthalene diisocyanate, polymethylene polyphenylene diisocyanate, triphenylmethane triisocyanate, naphthylene diisocyanate and the like. Among these examples, tolylene diisocyanate, isophorone diisocyanate and lysine diisocyanate are preferred.

In preparation of the component (i), the copolymer for introducing a polymerizable double bond is prepared usually from the comonomers, i.e. the monomer of the formula (I) and the vinyl monomer containing a functional group for introducing a polymerizable double bond. When required, other monomers are usable as an additional comonomer. Examples of useful other monomers are esters of acrylic or methacrylic acid with monohydric alcohol (having 1 to 24 carbon atoms), hydroxyalkyl (having 2 to 8 carbon atoms) acrylate or methacrylate, styrene, derivatives thereof, acrylonitrile, methacrylonitrile, vinyl acetate, vinyl chloride, etc. These monomers are usable singly or at least two of them can be used in mixture.

The copolymer to be used in preparation of the component (i) can be prepared by copolymerizing at least one of monomers of the formula (I) and at least one of vinyl monomers containing a functional group for introducing a polymerizable double bond by conventional polymerization methods such as solution polymerization, suspension polymerization or like methods. In respect of the proportions of the two comonomers, about 50% to about 97% by weight, preferably about 70% to about 95% by weight, of the former comonomer and about 3% to about 50% by weight, preferably about 5% to about 30% by weight, of the latter comonomer, are used based on the total weight of the two comonomers in view of the curability and the refractive index of the composition of the invention. When required, less than 100 parts by weight of other monomer is suitably used per 100 parts by weight of the two comonomers as combined. The copolymer has a number-average molecular weight of about 3,000 to about 50,000, preferably about 5,000 to about 30,000.

The component (i) of the composition according to the present invention can be obtained by reacting the functional group contained in the copolymer with the compound containing a polymerizable double bond and a functional group reactive with the functional group by an ester linkage-forming reaction, urethane linkage-forming reaction or the like to introduce the polymerizable double bond into the copolymer. The amounts of the copolymer and the compound used are not specifically limited and are suitable if the amounts are such that the unsaturation degree of the reaction product (the equivalent amount of the polymerizable double bond per 1,000 of number-average molecular weight) is in the range of about 0.2 to about 3.0, preferably about 0.3 to about 2.0. It is desirable that the component (i) prepared by introduction of the polymerizable double bond have a number-average molecular weight of about 3,100 to about 62,000, preferably about 5,100 to about 31,000.

Preferred examples of the polymerizable double bond-containing resin to be used as the component (i) are as follows:

(a) a polymerizable double bond-containing resin prepared by reacting a carboxyl group-containing vinyl monomer with a copolymer comprising a monomer of the formula (I) and an epoxy group-containing or hydroxyl group-containing vinyl monomer as the comonomers to esterify the epoxy group or hydroxyl group and the carboxyl group, (b) a polymerizable double bond-containing resin prepared by reacting an epoxy group-containing or hydroxyl group-containing vinyl monomer with a copolymer comprising a monomer of the formula (I) and a carboxyl group-containing vinyl monomer as the comonomers to esterify the carboxyl group and the epoxy group or hydroxyl group, (c) a polymerizable double bond-containing resin prepared by reacting a hydroxyl group-containing vinyl monomer with a copolymer comprising a monomer of the formula (I) and a hydroxyl group-containing vinyl monomer as the comonomers via a polyisocyanate compound to form a urethane linkage, and (d) a polymerizable double bond-containing resin prepared by reacting a hydroxyl group-containing monomer with a copolymer comprising a monomer of the formula (I) and an isocyanate group-containing vinyl monomer as the comonomers to form a urethane linkage.

A preferred amount of the compound to be reacted with the copolymer in the ester linkage-forming reaction for preparation of the resin (a) or (b) is about 0.3 to about 1 mole per mole of the functional group of the copolymer.

It is preferred to prepare the resin (c), for example, by the following methods. 1. A polyisocyanate compound is reacted with the hydroxyl group of the copolymer in a ratio of about 1 mole of the former per mole of the latter by a urethane linkage-forming reaction, and then the isocyanate group of the reaction product is reacted with the hydroxyl group of the hydroxyl group-containing vinyl monomer by a urethane linkage-forming reaction to introduce the polymerizable double bond-containing group into the copolymer. 2. A polyisocyanate compound and a hydroxyl group-containing vinyl monomer in equimolar amounts are subjected to a urethane linkage-forming reaction. Then the hydroxyl group of the copolymer and the isocyanate group of the reaction product are caused to undergo a urethane linkage-forming reaction to introduce the polymerizable double bond-containing group into the copolymer. The reaction product is used preferably in an amount of about 0.3 to about 1 mole per mole of the hydroxyl group of the copolymer.

It is preferable to prepare the resin (d), for example, by reacting the hydroxyl group-containing vinyl monomer with the isocyanate group of the copolymer in a ratio of about 0.3 to about 1 mole of the former per mole of the latter by a urethane linkage-forming reaction to introduce the polymerizable double bond-containing group into the copolymer.

The portion of the component (i) formed from the monomer of the formula (I) in the polymerizable double bond-containing resin serves, in combination with the component (ii), to reduce the refractive index of the cured composition (e.g. cured coating layer) and to retain the physical strength of the cured composition. If the polymerizable double bond is used in a large amount which falls within the specified range of the unsaturation degree, the molecular weight between crosslinks decreases, thereby resulting in formation of cured composition having an increased hardness.

The component (ii) is used as a reactive diluent and the fluoroalkyl acrylate or methacrylate of the formula (I) is employed as such. The examples of the fluoroalkyl acrylate or methacrylate given hereinbefore as useful in preparation of the component (i) are also usable for component (ii). Among these examples, 1H,1H,2H,2H-heptadecafluorodecyl acrylate or methacrylate, 1H,1H,5H-octafluoropentyl acrylate or methacrylate and the like are preferred. In the practice of the present invention, a portion of the fluoroalkyl acrylate or methacrylate as the component (ii), usually 50% by weight thereof or less, can be replaced by the other monomer as exemplified above in respect of the component (i) or oligomer thereof. Examples of useful oligomers are polyol acrylate or methacrylate, polyester acrylate or methacrylate, polyurethane acrylate or methacrylate, silicone acrylate or methacrylate and like polymerizable double bond-containing oligomers.

The composition of the present invention is prepared by mixing together the components (i) and (ii), the amounts thereof being about 5% to about 95% by weight, preferably about 20% to about 80% by weight, of the component (i) and about 5% to about 95% by weight, preferably about 20% to about 80% by weight, of the component (ii), based on the total weight of the two components. If more than 95% by weight of the component (ii) serving as a reactive diluent is used, the composition obtained is undesirable because it tends to have reduced compatibility and to impair the mechanical properties of the cured composition. However, if less than 5% by weight of the component (ii) is used, the resulting composition is undesirable because it is likely to have a higher refractive index and thus to form a cladding with deteriorated properties.

The curable composition of the invention thus obtained rapidly crosslinks to cure on irradiation of actinic radiation such as ultraviolet rays and electron beams.

When the composition of the invention is cured by irradiation of UV rays, it is preferred to add a photopolymerization initiator to the composition. Examples of useful photopolymerization initiators are benzoin, benzoin methyl ether, benzoin ethyl ether, benzoin n-propyl ether, benzoin n-butyl ether, benzyl, benzophenone, p-methylbenzophenone, diacetyl, Eosine, Thionine, Michler's ketone, acetohenone, 2-chlorothioxanthone, anthraquinone, chloroanthraquinone, 2-methylanthraquinone, α-hydroxyisobutylphenone, p-isopropyl-α-hydroxyisobutylphenone, α,α'-dichloro-4-phenoxyacetophenone, 1-hydroxy-1-cyclohexylacetophenone, 2,2-dimethoxy-2-phenylacetophenone, methylbenzoin formate, 2-methyl-1-[4-(methylthio)phenyl]-2-morpholinopropane, dichlorothioxanthone, diisopropylthioxanthone, phenyl disulfide-2-nitrosofluorene, butyroin, anisoin ethyl ether, azobisisobutyronitrile, tetramethylthiuram disulfide, etc. These photopolymerization initiators are usable singly or at least two of them can be used in mixture. A preferred amount of the photopolymerization initiator is about 0.1 to about 10 parts by weight per 100 parts by weight of the total amount of the components (i) and (ii). A photopolymerization accelerator can be used in mixture with the photopolymerization initiator to promote the optically crosslinking reaction started by the initiator. Examples of useful photopolymerization accelerators are triethylamine, triethanolamine, 2dimethylaminoethanol and like tertiary amines, triphenylphosphine and like alkylphosphines, β-thioglycol and like thiols, etc.

Exemplary of the source of UV radiation for curing are a mercury lamp, high-pressure mercury lamp, superhigh-pressure mercury lamp, xenon lamp, carbon arc, metal halide lamp, sunlight, etc. A preferred atmosphere in which UV light is irradiated is air or inert gas. When UV light is irradiated in air, it is preferable to use a high-pressure mercury lamp as a radiation source. While the radiation dose is not specifically limited, a proper dose is about 10 to about 2,000 mJ/cm$_2$.

The accelerator for electron beams which is used in curing by irradiation of electron beams include, for example, a Cockcroft type, Cockcroft-Walton type, resonance transformer type, transformer type, insulated core transformer type, dynamitron type, linear filament type, broad beam type, area beam type, cathode electron type, high-frequency type, etc. The dose of electron beams to be irradiated is not specifically limited insofar as it is sufficient to cure the composition. Generally electron beams are irradiated, however, at a dose of about 0.5 to about 20 Mrad at about 100 to about 2,000 KeV. A preferred atmosphere for irradiation of electron beams is inert gas.

The curable composition of the present invention is remarkably suitable in particular for forming claddings for optical fibers. The cladding formed therefrom is free of the drawbacks of conventional claddings described hereinbefore and is fully satisfactory in all of the properties required of claddings. Stated more specifically, a cladding can be easily produced, for example, by applying the composition of the present invention by die coating, immersion or like conventional coating method to a core prepared by drawing a quartz or like material into threads and irradiating ultraviolet rays, electron beams or like actinic radiation over the layer of the composition to cure the layer rapidly by crosslinking. Using the cladding thus obtained, a high-performance optical fiber can be prepared.

The cladding formed from the composition of the present invention can exhibit all the aforesaid properties required of claddings to a fully satisfactory extent. Since the fluorine content of the composition can be adjusted to about 25% to about 60% by weight according to the present invention, there can be easily obtained therefrom a cladding having a refractive index of about 1.45 to about 1.36 which is so low as to make it possible to transmit light in a greater amount. Further, the cladding prepared according to the invention is hard and remarkable in flexibility, and scarcely affected by temperatures in respect of properties. Consequently, for example, even if one end of optical fibers is fixed, e.g. with an adhesive, the core covered with the cladding is firmly held. And if the temperature changes, the core therearound is free from piston-like movement. The cladding is markedly enhanced in flexibility when formed from the composition of the invention having a urethane linkage. Since the composition of the invention provides optical fibers with a great NA value (NA= abbreviation of numerical aperture, which is given by the equation $\sqrt{N_1^2 - N_2^2}$ wherein $N_1$ is the refractive index of the core and $N_2$ is the refractive index of the cladding), light is transmitted therethrough at a larger angle of incidence with the result that a greater amount of light can be transmitted. With this characteristic, the optical fibers resulting from the composition of the invention, when used as light guides for illuminations or decorations, can emit light beams with substantially no loss caused during transmission; when used as an endoscope or like image fiber devices, it can make the image more clearly visible; and when used for communication devices, it can raise the intensity level of optical signals sufficiently to reduce the connector loss of light rays and electricity, thereby making it possible to use, e.g. an inexpensive light emission diode or photo diode.

The optical fibers with the cladding prepared from the composition of the present invention can be suitably used, e.g., as communication devices, image guides, light guides and optical fiber-applied measuring instruments, and in other fields of optical fiber technologies.

Because of its low surface tension and low refractive index, the composition of the present invention can be utilized also as a water repellents, agents for improving the surface properties, nonreflective coats, piezo-electric devices, ultraviolet light resists, electron beam resists, ion exchange membranes and the like. Further the composition of the present invention has a good weatherability and is usable also as a coating composition for exterior coating.

The present invention will be described below in greater detail with reference to Preparation Examples illustrative of the preparation of the component (i), Examples and Comparison Examples wherein the parts and percentages are all by weight unless otherwise specified.

EXAMPLES

PREPARATION EXAMPLE 1

Preparation of Component (i)-I

A 21 4-necked flask was charged with 60 parts of methyl isobutyl ketone and 60 parts of metaxylenehexafluoride and the mixture was heated to 110° C. Added dropwise thereto were 170 parts of 1H,1H,2H,2H-heptadecafluorodecyl acrylate, 30 parts of glycidyl methacrylate and 6 parts of t-butylperoxy-2-ethyl hexanoate through a dropping funnel over a period of 3 hours after which the mixture was subjected to aging for 1 hour. Then added dropwise thereto were 1 part of t-butylperoxy-2-ethyl hexanoate and 13 parts of methyl isobutyl ketone over a period of 1 hour. Thereafter the mixture was subjected to aging for 7 hours, giving a copolymer having a number-average molecular weight of about 15,000. To the copolymer thus obtained were added 0.1 part of hydroquinone, 1 part of triethylamine and 16 parts of acrylic acid and the mixture was maintained at a temperature of 110° C. for 5 hours, producing an acryloyl group-containing resin having a number-average molecular weight of 16,000 and an unsaturation degree of 1.0. The resin solution thus prepared was dried at 40° C. under reduced pressure to remove the solvent, giving a resin having a solids content of 100%.

PREPARATION EXAMPLE 2

Preparation of Component (i)-II

In the same manner as in Preparation Example 1, 6 parts of acrylic acid was reacted with a copolymer comprising 190 parts of 1H,1H,5H-octafluoropentyl acrylate and 10 parts of glycidyl methacrylate, giving an acryloyl group-containing resin having a number-average molecular weight of about 16,000 and an unsaturation degree of 0.4 which was dried in the same manner as in Preparation Example 1, producing a resin having a solids content of 100%.

PREPARATION EXAMPLE 3

Preparation of Component (i)-III

In the same manner as in Preparation Example 1, 20 parts of acrylic acid was reacted with a copolymer comprising 80 parts of 1H,1H,2H,2H-heptadecafluorodecyl acrylate, 80 parts of 1H,1H,5H-octafluoropentyl acrylate and 40 parts of glycidyl methacrylate, giving an acryloyl group-containing resin having a number-average molecular weight of about 20,000 and an unsaturation degree of 1.3 which was dried in the same manner as in Preparation Example 1, producing a resin having a solids content of 100%.

PREPARATION EXAMPLE 4

Preparation of Component (i)-IV

A 2l 4-necked flask was charged with 60 parts of methyl isobutyl ketone and 60 part of metaxylenehexafluoride and the mixture was heated to 110° C. Added dropwise thereto were 170 parts of 1H,1H,2H,2H-heptadecafluorodecyl acrylate, 20 parts of acrylic acid and 6 parts of t-butylperoxy-2-ethyl hexanoate through a dropping funnel over a period of 3 hours after which the mixture was subjected to aging for 1 hour. Then added dropwise thereto were 1 part of t-butylperoxy-2-ethyl hexanoate and 13 parts of methyl isobutyl ketone over a period of 1 hour. Thereafter the mixture was subjected to aging for 7 hours, giving a copolymer having a number-average molecular weight of about 14,000. To the copolymer thus obtained were added 0.1 part of hydroquinone, 1 part of triethylamine and 35 parts of glycidyl methacrylate and the mixture was maintained at a temperature of 110° C. for 5 hours, producing an acryloyl group-containing resin having a number-average molecular weight of 15,000 and an unsaturation degree of 1.1. The resin solution thus prepared was dried at 40° C. under reduced pressure to remove the solvent, giving a resin having a solids content of 100%.

PREPARATION EXAMPLE 5

Preparation of Component (i)-V

In the same manner as in Preparation Example 4, 10 parts of glycidyl methacrylate was reacted with a copolymer comprising 190 parts of 1H,1H,5H-octafluoropentyl acrylate and 7.5 parts of methacrylic acid, giving an acryloyl group-containing resin having a number-average molecular weight of about 17,000 and an unsaturation degree of 0.4 which was dried in the same manner as in Preparation Example 4, producing a resin having a solids content of 100%.

PREPARATION EXAMPLE 6

Preparation of Component (i)-VI

In the same manner as in Preparation Example 4, 80 parts of glycidyl methacrylate was reacted with a copolymer comprising 80 parts of 1H,1H,2H,2H-heptadecafluorodecyl acrylate, 80 parts of 1H,1H,5H-octafluoropentyl acrylate and 20 parts of acrylic acid, giving an acryloyl group-containing resin having a number-average molecular weight of about 19,000 and an unsaturation degree of 1.3 which was dried in the same manner as in Preparation Example 4, producing a resin having a solids content of 100%.

PREPARATION EXAMPLE 7

Preparation of Component (i)-VII

In the same manner as in Preparation Example 4, 32 parts of 2-hydroxyethyl methacrylate and 2 parts of p-toluenesulfonic acid were reacted with a copolymer comprising 170 parts of 1H,1H,2H,2H-heptadecafluorodecyl acrylate and 20 parts of acrylic acid at 130° C. for 3 hours, whereby an acryloyl group-containing resin was obtained with a number-average molecular weight of about 14,500 and an unsaturation degree of 1.0 and was dried in the same manner as in Preparation Example 4, producing a resin having a solids content of 100%.

PREPARATION EXAMPLE 8

Preparation of Component (i)-VIII

A 2l 4-necked flask was charged with 60 parts of methyl isobutyl ketone and 60 parts of metaxylenehexafluoride and the mixture was heated to 110° C. Added dropwise thereto were 170 parts of 1H,1H,2H,2H-heptadecafluorodecyl acrylate, 10 parts of 2-hydroxyethyl methacrylate and 6 parts of t-butylperoxy-2-ethyl hexanoate through a dropping funnel over a period of 3 hours after which the mixture was subjected to aging for 1 hour. Then added dropwise thereto were 1 part of t-butylperoxy-2-ethyl hexanoate and 13 parts of methyl isobutyl ketone over a period of 1 hour. Thereafter the mixture was subjected to aging for 7 hours, giving a copolymer having a number-average molecular weight of about 15,000. To the copolymer thus obtained were added 22 parts of a reaction product of tolylene diisocyanate and 2-hydroxyethyl acrylate in equimolar amounts, and 0.1 part of hydroquinone and the mixture was subjected to reaction at 100° C. for 3 hours, producing an acryloyl group-containing resin having a number-average molecular weight of 16,500 and an unsaturation degree of 0.38. The resin solution thus prepared was dried at 40° C. under reduced pressure to remove the solvent, giving a resin having a solids content of 100%.

PREPARATION EXAMPLE 9

Preparation of Component (i)-IX

Seventy-seven parts of a reaction product of isophorone diisocyanate and 2-hydroxyethyl acrylate in equimolar amounts was reacted in the same manner as in Preparation Example 8 with a copolymer comprising 150 parts of 1H,1H,3H-tetrafluoropropyl acrylate and 30 parts of 2-hydroxyethyl methacrylate, giving an acryloyl group-containing resin having a number-average molecular weight of about 21,500 and an unsaturation degree of 1.0 which was dried in the same manner as in Preparation Example 8, producing a resin having a solids content of 100%.

PREPARATION EXAMPLE 10

Preparation of Component (i)-X

In the same manner as in Preparation Example 8, 20 parts of 2-hydroxyethyl acrylate was reacted with a copolymer comprising 160 parts of 1H,1H,5Hoctafluoropentyl acrylate and 60 parts of a reaction product of isophorone diisocyanate and 2-hydroxyethyl methacrylate in equimolar amounts, giving an acryloyl group-containing resin having a number-average molecular weight of about 12,000 and an unsaturation degree of 0.71 which was dried in the same manner as in Preparation Example 8, producing a resin having a solids content of 100%.

EXAMPLES 1 TO 10 AND COMPARISON EXAMPLES 1 to 9.

The components as shown below in Table 1 were mixed together, giving curable compositions in Examples 1 to 10 and Comparison Examples 1 to 9.

TABLE 1

| Composition | Example 1 | Example 2 | Example 3 | Comparison Example 1 | Comparison Example 2 | Comparison Example 3 |
|---|---|---|---|---|---|---|
| Component (i) | | | | | | |
| Component (i)-I | 100 | | | 100 | | |
| Component (i)-II | | 100 | | | | |
| Component (i)-III | | | 100 | | | |
| Comparison resin-I | | | | | 100 | |
| Comparison resin-II | | | | | | 100 |
| Component (ii) | | | | | | |
| 1H,1H,2H,2H—heptadecafluorodecyl acrylate | 100 | 140 | | | | 100 |
| 1H,1H,5H—octafluoropentyl acrylate | | | 70 | | | |
| UV-7000B | | | 10 | | | |
| Styrene (diluent) | | | | 100 | | |
| Metaxylenehexafluoride (diluent) | | | | | 30 | |
| Photopolymerization initiator | | | | | | |
| Darocur-1173 | 4 | 5 | | 4 | | 4 |
| Irgacure-651 | | | 4 | | | |

| Composition | Example 4 | Example 5 | Example 6 | Example 7 | Comparison Example 4 | Comparison Example 5 | Comparison Example 6 |
|---|---|---|---|---|---|---|---|
| Component (i) | | | | | | | |
| Component (i)-IV | 100 | | | | 100 | | |
| Component (i)-V | | 100 | | | | | |
| Component (i)-VI | | | 100 | | | | |
| Component (i)-VII | | | | 100 | | | |
| Comparison resin-III | | | | | | 100 | |
| Comparison resin-IV | | | | | | | 100 |
| Component (ii) | | | | | | | |
| 1H,1H,2H,2H—heptadecafluorodecyl acrylate | 100 | 140 | | 100 | | | 100 |
| 1H,1H,5H—octafluoropentyl acrylate | | | 70 | | | | |
| UV-7000B | | | 10 | | | | |
| Styrene (diluent) | | | | | 100 | | |
| Metaxylenehexafluoride (diluent) | | | | | | 30 | |
| Photopolymerization initiator | | | | | | | |
| Darocur-1173 | 3 | 4 | | 4 | 3 | | 4 |
| Irgacure-651 | | | 5 | | | | |

| Composition | Example 8 | Example 9 | Example 10 | Comparison Example 7 | Comparison Example 8 | Comparison Example 9 |
|---|---|---|---|---|---|---|
| Component (i) | | | | | | |
| Component (i)-VIII | 100 | | | 100 | | |
| Component (i)-IX | | 100 | | | | |
| Component (i)-X | | | 100 | | | |
| Comparison resin-V | | | | | 100 | |
| Comparison resin-VI | | | | | | 100 |
| Component (ii) | | | | | | |
| 1H,1H,3H—tetrafluoropropyl acrylate | 100 | | | | | 100 |
| 1H,1H,2H,2H—heptadecafluorodecyl acrylate | | 150 | | | | |
| 1H,1H,5H—octafluoropentyl acrylate | | | 50 | | | |
| Styrene (diluent) | | | | 100 | | |
| Metaxylenehexafluoride (diluent) | | | | | 30 | |
| Photopolymerization initiator | | | | | | |
| Darocur-1116 | | 5 | | | | |
| Darocur-1173 | 4 | | 2 | 4 | | 4 |

The values shown above in Table 1 are all intended to be expressed by parts. "UV-7000B" is a trademark for an acrylic urethane oligomer manufactured by Nippon Gohsei Kagaku Kogyo Kabushiki Kaisha, Japan and having a number-average molecular weight of 3,000 and an unsaturation degree of 1.2. "Darocur-1173" is a trademark for a photopolymerization initiator manufactured by E. Merck, West Germany and containing $\alpha$-hydroxyisobutylphenone as an active component. "Irgacure-651" is a trademark for a photopolymerization initiator manufactured by Ciba-Geigy Corp., Switzerland and containing 2,2-dimethoxy-2-phenylacetophenone as an active component. "Darocur-1116" is a trademark for a photopolymerization initiator manufactured by E. Merck and containing 4'-isopropyl-2-hydroxy-2-methyl-propiophenone as an active component. The term "comparison resin-I" denotes a resin with a number-average molecular weight of about 16,000 prepared in the same manner as in Preparation Example 1 with the exception of using methyl methacrylate in place of the glycidyl acrylate used in Preparation Example 1 and omitting the reaction with acrylic acid. The term "comparison resin-II" denotes a resin with a number-average molecular weight of about 15,000 and an unsaturation degree of 1.0 prepared in the same manner as in Preparation Example 1 with the exception of using 2-ethylhexyl acrylate in place of the 1H,1H,2H,2H-heptadecafluorodecyl acrylate used in Preparation Example 1. The term "comparison resin-III" denotes a resin with a number-average molecular weight of about 15,000 prepared in the same manner as in Preparation Example 4 with the exception of using methyl methacrylate in place of the acrylic acid used in Preparation Example 4 and omitting the reaction with glycidyl methacrylate. The term "comparison resin-IV" denotes a resin with a number-average molecular weight of about 14,000 and an unsaturation degree of 1.1 prepared in the same manner as in Preparation Example 4 with the exception of using 2-ethylhexyl acrylate in place of the 1H,1H,2H,2H-heptadecafluorodecyl acrylate used in Preparation Example 4. The term "comparison resin-V" denotes a resin with a number-average molecular weight of about 16,000 prepared in the same manner as in Preparation Example 8 with the exception of using methyl methacrylate in place of the 2-hydroxyethyl acrylate used in Preparation Example 8 and omitting the subsequent reaction. The term "comparison resin-VI" denotes a resin with a number-average molecular weight of about 16,500 and an unsaturation degree of 0.38 prepared in the same manner as in Preparation Example 8 with the exception of using 2-ethylhexyl acrylate in place of the 1H,1H,2H,2H-heptadecafluorodecyl acrylate used in Preparation Example 8.

Each of the curable compositions obtained in Examples 1 to 10 to Comparison Examples 1 to 9 was applied to a core of quartz glass having a diameter of 200 μm (with a refractive index of 1.458 as measured at 20° C. with sodium D-line) by a die coater to form therearound a layer of the thickness as shown below in Table 2 and curing the layer by irradiation of UV rays from a high-pressure mercury lamp at the dose as indicated in Table 2, whereby a cladding was formed from which an optical fiber was subsequently produced.

The refractive index of the cladding, NA and transmission loss before and after a test for cold resistance and heat resistance were measured in respect of the optical fiber thus obtained. The refractive index of the cladding, NA and transmission loss before and after the test for cold resistance and heat resistance were determined by the following methods.

Refractive Index of Cladding

Each test composition was applied to a glass plate to form a layer of about 50 μm thickness and cured by irradiation of UV rays. The layer was separated and the refractive index of the layer was measured by an Abbe refractometer. NA was determined by the result thus obtained.

Transmission loss

Light rays from a laser diode were introduced via an input device into one end of an optical fiber having a length of slightly more than 1 km. The electric power (Po) of light rays received at the other end of the optical fiber was determined. The optical fiber was cut at a position 1 km away as measured from the egress end of the optical fiber toward the ingress end thereof. The electric power of light rays received at the cut position was taken as the power of incident rays (Pi) to be transmitted from the cut position toward the egress end thereof. The transmission loss was given by the following equation.

$$\alpha = -(10/L) \cdot \log_{10}(Po/Pi)$$

wherein $\alpha$ is a transmission loss (dB/km) and L is a length (km) of the optical fiber.

Test for cold resistance and heat resistance

The optical fiber was left to stand at −30° C. for 12 hours and then at 80° C. for 12 hours, and this operation was taken as one cycle. Twenty cycles were repeated for each test fiber. Table 2 below shows the results.

TABLE 2

|  | Example | | | Comparison Example | | |
|---|---|---|---|---|---|---|
|  | 1 | 2 | 3 | 1 | 2 | 3 |
| Thickness of cladding (μm) | 50 | 10 | 15 | 50 | 50 | 50 |
| UV radiation dose (mJ/cm$^2$) | 150 | 150 | 300 | 600 |  | 300 |
| Test Results |  |  |  |  |  |  |
| Refractive index of cladding | 1.40 | 1.41 | 1.38 | 1.49 | 1.43 | 1.46 |
| NA | 0.41 | 0.37 | 0.47 |  | 0.28 |  |
| Transmission loss (dB/km) |  |  |  |  |  |  |
| Before test for cold and heat resistance | 4.5 | 4.5 | 5.0 | NTP* | 8.0 | NTP |
| After test for cold and heat resistance | 5.0 | 5.0 | 6.0 | NTP | 20.0 | NTP |

|  | Example | | | | Comparison Example | | |
|---|---|---|---|---|---|---|---|
|  | 4 | 5 | 6 | 7 | 4 | 5 | 6 |
| Thickness of cladding (μm) | 60 | 10 | 20 | 60 | 60 | 50 | 50 |
| UV radiation dose (mJ/cm$^2$) | 150 | 120 | 300 | 150 | 600 |  | 300 |
| Test Results |  |  |  |  |  |  |  |
| Refractive index of cladding | 1.40 | 1.41 | 1.38 | 1.41 | 1.49 | 1.43 | 1.46 |
| NA | 0.41 | 0.37 | 0.47 | 0.42 |  | 0.28 |  |
| Transmission loss (dB/km) |  |  |  |  |  |  |  |
| Before test for cold and heat resistance | 5.2 | 5.0 | 5.5 | 5.5 | NTP* | 7.0 | NTP |
| After test for cold and heat resistance | 5.5 | 5.5 | 6.5 | 6.0 | NTP | 21.0 | NTP |

|  | Example | Comparison Example |
|---|---|---|

TABLE 2-continued

|  | 8 | 9 | 10 | 7 | 8 | 9 |
|---|---|---|---|---|---|---|
| Thickness of cladding (μm) | 50 | 10 | 15 | 50 | 50 | 50 |
| UV radiation dose (mJ/cm$^2$) | 150 | 150 | 300 | 600 |  | 300 |
| Test Results |  |  |  |  |  |  |
| Refractive index of cladding | 1.41 | 1.42 | 1.39 | 1.49 | 1.43 | 1.46 |
| NA | 0.37 | 0.33 | 0.44 |  | 0.28 |  |
| Transmission loss (dB/km) |  |  |  |  |  |  |
| Before test for cold and heat resistance | 4.0 | 4.0 | 4.5 | NTP* | 8.0 | NTP |
| After test for cold and heat resistance | 4.5 | 4.5 | 5.0 | NTP | 20.0 | NTP |

Note: NTP = No transmitting properties

Among the test fibers as shown above in Table 2, those obtained in Comparison Examples 2, 5 and 8 were dried at 50° C. for 30 minutes instead of exposure to UV radiation.

Table 2 shows that the optical fibers containing the claddings prepared from the curable compositions of the present invention were found to have excellent properties because these optical fibers had great NA values and thus high intensity levels of optical signals, involved markedly small amounts of transmission loss and slight degrees of reduction of transmitting properties after the test for resistances to cold and heat, and were able to transit optical signals with a high efficiency over a long distance.

EXAMPLE 11

One hundred parts of 1H,1H,2H,2H-heptadecafluorodecyl acrylate and 5 parts of 1,6-hexanediol diacrylate were mixed and dissolved in 100 parts of the resin obtained in Preparation Example 4 and then 100 parts of titanium dioxide was dispersed in the solution, giving a white enamel.

The coating composition thus obtained was applied to a plate of acrylic resin to a thickness of 50 μm and cured by irradiation of electron beams at a dose of 5 Mrad at 300 Kev. The layer thus formed was subjected to accelerated weathering test by a sunshine weatherometer and showed good results in respect of gloss retention percentage and discoloration.

EXAMPLE 12

Ninety-eight parts of 1H,1H,2H,2H-heptadecafluorodecyl acrylate, 2 parts of 1,6-hexanediol diacrylate and 80 parts of titanium dioxide were mixed and dispersed in 100 parts of the resin obtained in Preparation Example 8, giving a white enamel.

The white enamel thus obtained was applied to a plate of ABS (acrylonitrile butadiene styrene) to a thickness of 40 μm, and was Cured by irradiating electron beams at a dose of 6 Mrad at 300 Kev, providing the plate coated with the white layer.

The coated plate was subjected to accelerated weathering test by a sunshine weatherometer for 2,000 hours. The coated plate was found to have a high gloss retention percentage (more than 90%) and presented aesthetically acceptable appearance.

EXAMPLE 13

A resin varnish comprising 100 parts of the resin obtained in Preparation Example 8 and 80 parts of 1H,1H,5H-octafluoropentyl methacrylate was applied to a PET (polyethylene terephthalate) film of 25 μm thickness to a thickness of 3 μm and was cured by irradiation of electron beams at a dose of 5 Mrad at 300 Kev.

The film thus obtained had a low refractive index and thus an increased transparency, 92% sunlight permeability, whereas a PET film was 85% in this respect.

EXAMPLE 14

Six parts of "Irgacure 184" (trademark for a photopolymerization initiator manufactured by Ciba-Geigy Corp., Switzerland, containing as an active component 1-hydroxy-1-cyclohexylacetophenone) was added to a resin varnish comprising 100 parts of the resin obtained in Preparation Example 9 and 100 parts of 1H,1H,5H-octafluoropentyl methacrylate, giving a UV radiation-curable fluorine-containing coating composition. The coating composition thus prepared was applied to an ABS plate to a thickness of 20 μm, and cured by irradiation of UV rays from a high-pressure mercury lamp at a dose of 200 mJ/cm$^2$.

The layer thus formed was so low in surface tension as to facilitate the removal of ice. To prove the possession of this property, ice was formed on the surface of the layer to determine the bonding power, which was found to be 1.2 kg/cm$_2$ and to display a good releasability. On the other hand, a releasability obtained from ice formed directly on an ABS plate was as poor as 4.2 kg/cm$^2$.

EXAMPLE 15

The coating composition obtained in Example 14 was applied to a cotton fabric piece and cured by irradiation of UV rays (from a cold mirror-type high-pressure mercury lamp). The coated cotton fabric piece exhibited a good water repellency whereas an untreated cotton fabric piece showed a low water repellency.

EXAMPLE 16

The resin varnish obtained in Example 13 was applied to a transparent vinyl chloride film to a thickness of 3 μm by a roll coater and cured by irradiation of electron beams at a dose of 3 Mrad at 300 Kev. The coated film was found to have a percent sunlight permeability improved by 10% over an untreated film and a percent heat dispersibility enhanced by 7% thereover.

We claim:

1. An optical fiber comprising:
 (a) a core fiber formed from a transparent material having a refractive index of about 1.43 to about 1.60; and
 (b) a cladding formed on said core, said cladding consisting essentially of:
  (i) a polymerizable double bond-containing resin prepared by reacting a copolymer comprising, as comonomers, (a) a fluoroalkyl acrylate or methacrylate represented by the formula (I)

$$CH_2=C(R)-COO(CX_2)_m(CF_2)_nX \qquad (I)$$

wherein R is methyl or hydrogen, X is fluorine or hydrogen, m is 1 or 2 and n is an integer of 1 to 12, and (b) a vinyl monomer containing a functional group for introducing a polymerizable double bond with a compound containing a functional group reactive with the functional group of the vinyl monomer and a polymerizable double bond to introduce the polymerizable double bond into the side chain of the copolymer; and (ii) a fluoroalkyl acrylate or methacrylate of the formula (I).

2. An optical fiber according to claim 1, wherein said cladding is polymerized by ultraviolet irradiation.

3. An optical fiber according to claim 1, wherein said cladding is polymerized by an electron beam.

4. A cladding material for an optical fiber consisting essentially of:

(i) a polymerizable double bond-containing resin prepared by reacting a copolymer comprising, as comonomers, (a) a fluoroalkyl acrylate or methacrylate represented by the formula (I)

$$CH_2=C(R)-COO(CX_2)_m(CF_2)_nX \qquad (I)$$

wherein R is methyl or hydrogen, X is fluorine or hydrogen, m is 1 or 2 and n is an integer of 1 to 12, and (b) a vinyl monomer containing a functional group for introducing a polymerizable double bond with a compound containing a functional group reactive with the functional group of the vinyl monomer and a polymerizable double bond to introduce the polymerizable double bond into the side chain of the copolymer; and (ii) a fluoroalkyl acrylate or methacrylate of the formula (I).

5. In a method for forming an optical fiber having a core and a cladding by drawing a transparent material having an index of refraction of about 1.43 to about 1.60 into a fiber and coating the fiber surface with a cladding having a lower refractive index than the core, the improvement comprising using as a cladding material a composition consisting essentially of:

(i) a polymerizable double bond-containing resin prepared by reacting a copolymer comprising, as comonomers, (a) a fluoroalkyl acrylate or methacrylate represented by the formula (I)

$$CH_2=C(R)-COO(CX_2)_m(CF_2)_nX \qquad (I)$$

wherein R is methyl or hydrogen, X is fluorine or hydrogen, m is 1 or 2 and n is an integer of 1 to 12, and (b) a vinyl monomer containing a functional group for introducing a polymerizable double bond with a compound containing a functional group reactive with the functional group of the vinyl monomer and a copolymerizable double bond to introduce the polymerizable double bond into the side chain of the copolymer; and (ii) a fluoroalkyl acrylate or methacrylate of the formula (I).

6. A method according to claim 5, wherein said cladding is polymerized by ultraviolet irradiation.

7. A method according to claim 5, wherein said cladding is polymerized by an electron beam.

* * * * *